(12) United States Patent
Popp et al.

(10) Patent No.: US 6,186,923 B1
(45) Date of Patent: Feb. 13, 2001

(54) INCREASED AUTOMATIC GEAR BOX SPONTANEITY

(75) Inventors: Christian Popp, Kressbronn; Friedrich Tenbrock, Langenargen; Hansjörg Rosi, Meckenbeuren, all of (DE)

(73) Assignee: ZF Friedrichshafen AG, Friedrichshafen (DE)

( * ) Notice: Under 35 U.S.C. 154(b), the term of this patent shall be extended for 0 days.

(21) Appl. No.: 09/402,378

(22) PCT Filed: May 22, 1998

(86) PCT No.: PCT/EP98/03025

§ 371 Date: Oct. 4, 1999

§ 102(e) Date: Oct. 4, 1999

(87) PCT Pub. No.: WO98/54490

PCT Pub. Date: Dec. 3, 1998

(30) Foreign Application Priority Data

May 31, 1997 (DE) .............................. 197 22 954

(51) Int. Cl.[7] .................................................. F16H 61/06
(52) U.S. Cl. .................................... 477/115; 477/154
(58) Field of Search ...................... 477/115, 121, 477/143, 154

(56) References Cited

U.S. PATENT DOCUMENTS

| 4,955,257 | * | 9/1990 | Terayama et al. | 477/154 |
| 5,285,880 | | 2/1994 | Minagawa et al. | 192/3.58 |
| 5,505,100 | | 4/1996 | Mitchell et al. | 74/335 |
| 5,609,068 | | 3/1997 | Gruhle et al. | 74/336 R |
| 5,624,351 | | 4/1997 | Fujita et al. | 477/148 |
| 5,706,197 | * | 1/1998 | Stasik et al. | 477/115 |
| 5,941,795 | * | 8/1999 | Tsuchiya et al. | 477/148 |
| 5,957,810 | * | 9/1999 | Ohashi et al. | 477/154 |

FOREIGN PATENT DOCUMENTS

| 4240621 | * | 6/1994 | (DE) . |
| 43 11 886 A1 | | 10/1994 | (DE) . |
| 0 288 799 A2 | | 11/1988 | (EP) . |
| 0 341 631 B1 | | 11/1989 | (EP) . |
| 0 738 845 A2 | | 10/1996 | (EP) . |

* cited by examiner

*Primary Examiner*—Sherry Estremsky
(74) *Attorney, Agent, or Firm*—Davis and Bujold

(57) ABSTRACT

The invention relates to a method for increasing the spontaneity of automatic gear boxes with overlapping gear shifts. The overlapping gear shifts consist of three phases. Upshifting from a first gear ratio to a second gear ratio is aborted and downshifting to a first gear ratio occurs if an abort criterion is detected. The abort criterion is validated if a request for downshifting is made by the driver and detected before the third overlapping shift phase begins.

6 Claims, 4 Drawing Sheets

| Clutch - Logic |||||||||
|---|---|---|---|---|---|---|---|---|
| POS/GEAR | Clutch ||||||| Free Wheel |
| | A | B | C | D | E | F | G | 1. G. |
| R = R-Gear | | * | | * | | | * | |
| N = Neutral | | | | | | * | * | |
| D, 1. Gear | * | | | | | | * | * |
| D, 2. Gear | * | | * | | | | * | |
| D, 3. Gear | * | | * | | | * | | |
| D, 4. Gear | * | | | | * | * | | |
| D, 5. Gear | | | * | | * | * | | |
| 1, 1. Gear | * | | | * | | | * | * |

\* = active

Fig. 2 ered via electromagnetic actuators of an electronic transmission control. Such a control and regulation method has been disclosed, e.g. in DE-OS 42 40 621.

INCREASED AUTOMATIC GEAR BOX SPONTANEITY

BACKGROUND OF THE INVENTION

The invention relates to a method for increasing the spontaneity in an automatic transmission in which the gear shifts are carried out as overlapping gear shifts. The overlapping gear shift comprises three phases. During the first phase the curve of a transmission input rotational speed is determined by the pressure curve of the first clutch, during the second phase the second clutch takes over the load from the first clutch and during the third phase the second clutch becomes completely closed.

In automatic transmissions, the gear shifts can be carried out as overlapping gear shifts, i.e. while a first clutch opens a second clutch closes. The pressure curve of the clutches involved in the gear shift is determined via electromagnetic actuators of an electronic transmission control. Such a control and regulation method has been disclosed, e.g. in DE-OS 42 40 621.

Gear shifts of the automatic transmission are usually initiated when a desired performance presettable by a driver, such as throttle valve position, exceeds an upshift or downshift characteristic line of a shift characteristic field. Together with the gear shifts triggered by means of accelerator pedal, a driver has the possibility at any desired moment of triggering manual gear shifts. For example, DE-OS 43 11 886 shows a device by which a driver can trigger gear shifts by means of a selector lever having a manual gate or switching levers on the steering wheel.

The following problem can now arise: during an overtaking operation the driver detects that he must give way to traffic coming from the opposite direction. As a reaction to this, he will interrupt the overtaking operation by releasing the accelerator pedal. Hereby an upshift can be triggered. During the upshift. if the driver now detects that the opposite lane is free, he will then again initiate the overtaking operation. For this purpose, the driver will either actuate the accelerator pedal or initiate a downshift via the selector lever. But according to the prior art, the automatic transmission will first completely carry out the upshift, followed by a blocking time and only then is a downshift begun. The problem thus consists in that a long time offset exists between the driver's wish relative to the acceleration and the reaction thereto of the automatic transmission.

SUMMARY OF THE INVENTION

The invention is based on the problem of improving the spontaneity of an automatic transmission.

According to the invention, the problem is solved during an upshift from a first to a second gear ratio by the upshift not being completely terminated and returning to the first gear ratio when an abort criterion is detected. An abort criterion exists when, prior to the start of the third phase of the overlapping gear shift, a request for a downshift presettable by a driver is detected. The solution, according to the invention, offers the advantage that for the above described practice, the rigid cycle of upshift, blocking time and subsequent downshift is interrupted. Unnecessary gear shifts, such as an upshift from the fourth to the fifth gear followed by a downshift from the fifth to the fourth gear, are eliminated. The characteristic of the automatic transmission is more closely tied to the driver's desired performance, i.e. the automatic transmission acts more spontaneously.

In a development of this, it is proposed that during the second phase the abort criterion be confirmed only when a time step activated with the start of the second phase still has not exceeded a limit value.

In one other development of the invention, it is proposed that during the second phase the abort criterion be confirmed only when the actual transmission input rotational speed value still has not fallen below the synchronous rotational speed of the first gear ratio. Both developments offer the advantage that an abort of the upshift be allowed only in a stage during which the driver still perceives no reaction of the automatic transmission. In other words: an abort of the upshift is no longer allowed when a reaction a driver can perceive, such as change of the vehicle acceleration occurs.

In one other development of the invention, it is proposed that during a change over from coast to traction or viceversa during the gear shift, the abort criterion be confirmed only after lapse of a time step. This develop contributes to comfort when shifting.

BRIEF DESCRIPTION OF THE DRAWINGS

A preferred embodiment is shown in the drawings. In the drawings:

FIG. 2 is a table of the clutch logic;

FIGS. 3A–3D are time line diagrams of a first embodiment of an upshift as an overlapping gear shift, with the gear shift cycle according to the prior art shown as a solid line, and a solution according to the invention shown as a dotted line, in which FIG. 3A is a graph showing in the course of time shift command SB;

FIG. 3B is a graph showing in the course of time the curve of the transmission input rotational speed nT;

FIG. 3C is a graph showing in the course of time the pressure level of the first clutch pK1;

FIG. 3D is a graph showing in the course of time the pressure level of the second clutch pK2;

FIGS. 4A–4D are time line diagrams of a second embodiment of a control method for load take over, FIGS. 4B–4D each showing two examples, the first example shows a gear shift cycle by dotted line, the second example shows a solid curve according to the invention, in which FIG. 4A is a graph showing in the course of time signal curve SB;

FIG. 4B is a graph showing in the course of time the input rotational speed nT;

FIG. 4C is a graph showing in the course of time the pressure level of first clutch pKl;

FIG. 4D is a graph showing in the course of time the pressure level of second clutch pK2.

DESCRIPTION OF THE PREFERRED EMBODIMENTS

Figure 1:
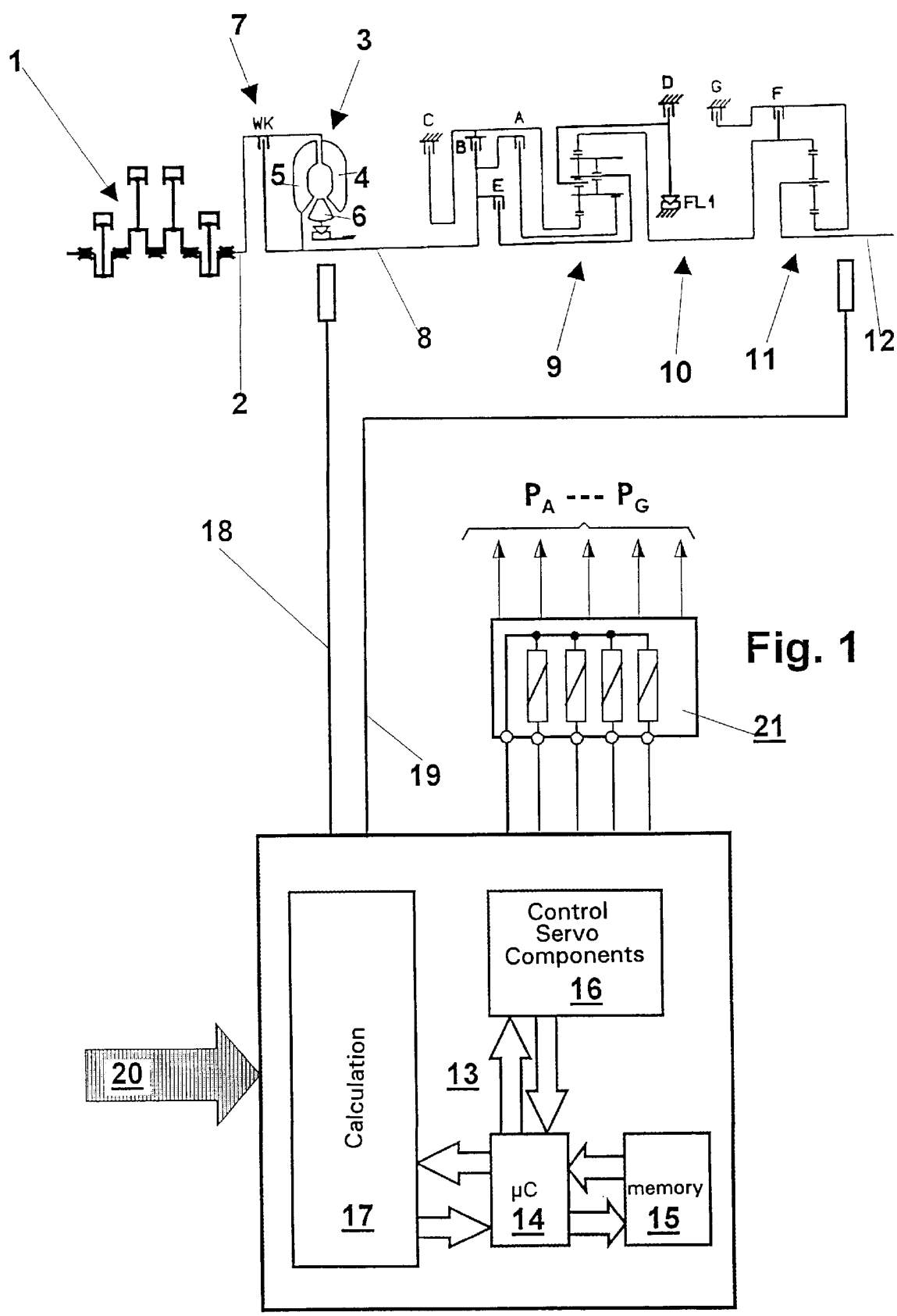
FIG. 1 is a system diagram.

FIG. 1 shows a system diagram of an automatic transmission. It consists of the intrinsic mechanical part, a hydrodynamic converter 3, a hydraulic control unit 21 and an electronic transmission control 13. The automatic transmission is driven by a prime move 1, preferably an internal combustion engine, via an output shaft 2. The latter is non-rotatably connected with the impeller 4 of the hydrodynamic converter 3. The hydrodynamic converter 3 is known to consist of a stator 4, a turbine wheel 5 and a stator 6. A converter clutch 7 is situated parallel to the hydrodynamic converter 3. The converter clutch 7 and the turbine wheel 5 lead to a turbine shaft 8. When the converter clutch 7 is actuated, the turbine shaft 8 has the same rotational speed as the input shaft 2. The mechanical part of the automatic transmission consists of clutches and brakes A to G, a free wheel 10 (FL1), a Ravigneaux set 9 and a rear-mounted planetary gear set 11. The output is effected via a transmission output shaft 12. The latter leads to a differential, not shown, which drives the input wheels of a vehicle, not shown, via two axle half shafts. A gear is determined by an adequate clutch/brake combination. The coordination of the clutch logic with the gear can be seen in FIG. 2. Thus, e.g. in a downshift from the fourth to the third gear the brake C closes and the clutch E is deactivated. As can be seen below from table 2, the gear shifts from the second up to the fifth gear ratios are each carried out as overlapping gear shifts. Since the mechanical part is not relevant for a better understanding of the invention, a detailed description is omitted.

The electronic transmission control 13 selects an adequate gear in accordance with the input variables 18 to 20. The electronic transmission control 13 then activates a corresponding clutch/brake combination, via the hydraulic control unit 21, where electromagnetic actuators are located. During the shift transitions, the electronic transmission control 13 determines the pressure curve of the clutches/brake taking part in the gear shift. Of the electronic transmission control 13 are shown as blocks in extensively simplified manner: micro-controller 14, memory 15, function block control actuators 16 and function block calculation 17. In the memory 15 are deposited the data relevant to the transmission. Data relevant to the transmission are, e.g. programs and specific characteristic values of the vehicle, the same as diagnosis data. The memory 15 is usually designed as EPROM, EEPROM, or as buffered RAM. In the function block calculation 17 are calculated the data relevant to a gear shift curve. The function block control actuators 16 serves for control of the actuators located in the hydraulic control unit 21. The electronic transmission control 13 receives input variables 20. Input variables 20 are, e.g. a variable representative of the driver's desired performance like the accelerator pedal/throttle valve position, or manually requested gear shifts, the signal of the torque emitted by the internal combustion engine, the rotational speed and temperature of the internal combustion engine, etc. The specific data of the internal combustion engine are usually prepared by a motor control unit. This is not shown in FIG. 1. As added input variables, the electronic transmission control 13 receives the rotational speed of the turbine shaft 18 and of the transmission output shaft 19.

FIGS. 3 and 4 are based on the case that a driver detects during an overtaking operation that he must let pass the traffic coming from the opposite direction. The driver will then interrupt his overtaking operation by releasing the accelerator pedal. It is assumed that hereby an upshift characteristic line is exceeded and the automatic transmission begins an upshift in coasting. During the upshift, the driver detects that the opposite road is now free and again initiates the overtaking operation by either actuating the accelerator pedal or requesting a manual downshift. It is assumed that in both cases a downshift characteristic line is exceeded.

In FIG. 3 is shown a first embodiment. It is based on an upshift as overlapping gear shift such as known from DE-OS 42 40 621. In a first phase of the overlapping gear shift, a rotational speed increase of the transmission input rotational speed is set. The second phase corresponds to the load take over. This is detected when the rotational speed increase diminishes. In a third phase the second clutch becomes completely closed.

Figure 3A:
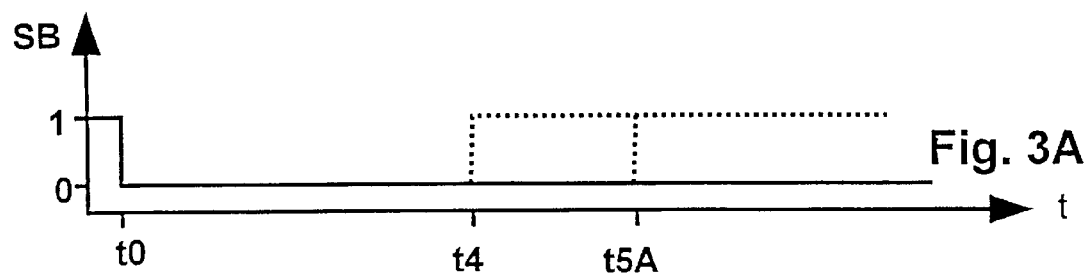

FIG. 3 consists of the parts FIGS. 3A to 3D. Each one shows here in the course of time: FIG. 3A the shift command SB, FIG. 3B the curve of the transmission input rotational speed nT, FIG. 3C the pressure curve of the first clutch pK1 and FIG. 3D the pressure curve of the second clutch pK2. Two examples are shown in each of FIGS. 3A to 3D. A first example shows the gear shift cycle, according to the prior art. This is designed as solid line. The second example shows a solution, according to the invention, designed in dotted line.

Figure 3B:
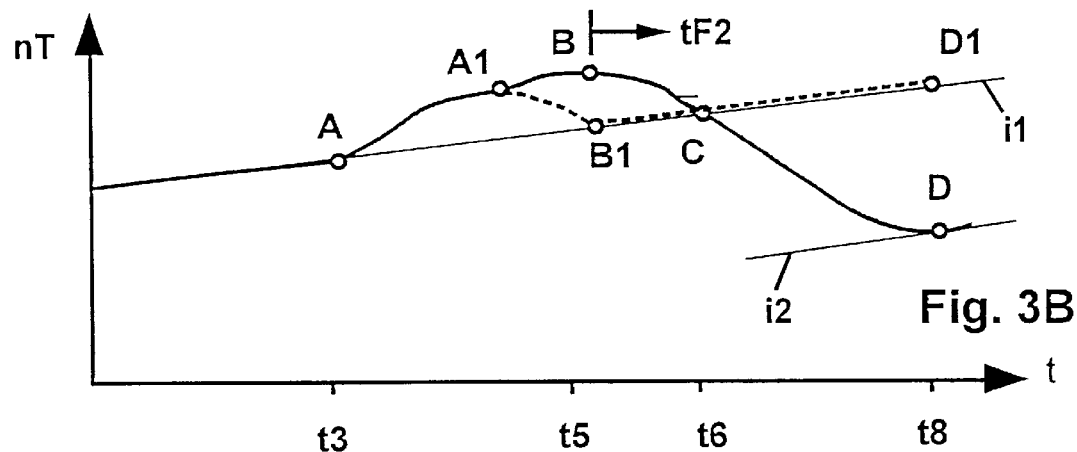
Figure 3C:
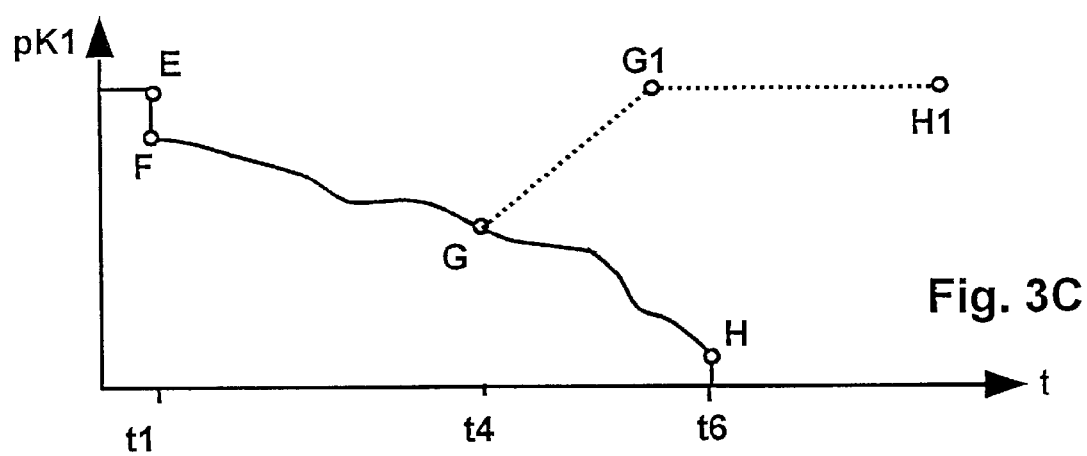
Figure 3D:
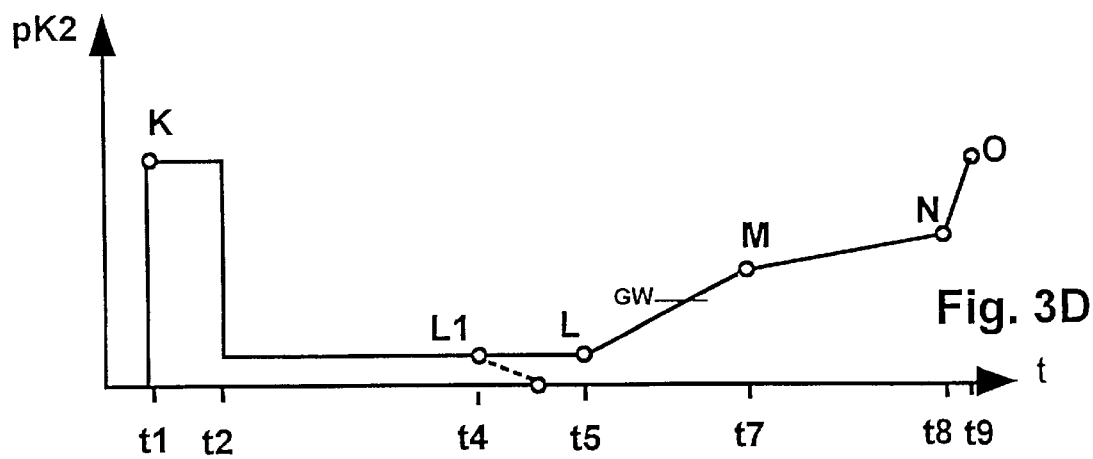

First example:

The gear shift cycle, according to the prior art, corresponds in FIG. 3B to the series of curves with the points A, B, C and D; in FIG. 3C to the series of curves with the points E, F, G and H; in FIG. 3D to the series of curves with the points K, L, M, N and O. At moment t0, the electronic transmission control 13 issues the shift command SB. In FIG. 3A, the signal curve hereby changes from one to zero. At moment t1, the pressure level of the first clutch K1 diminishes from a first to a second pressure level. This corresponds to the points E and F. Thereafter the first phase begins for the first clutch K1. During this phase, the pressure curve is regulated so that the transmission input rotational speed nT increases. This occurs at moment t3, point A. This increase in rotational speed is preset here as nominal value for a closed loop. Increase in rotational speed means that the transmission input rotational speed nT reaches a higher rotational speed value than would result from the first gear ratio i1. Likewise at moment t1 up to moment t2, the second clutch K2 is loaded with rapid filling pressure. The pressure level here corresponds to the value of the point K. Thereafter follows for the second clutch K2, a filling equalization phase up to moment t5. It is assumed that at moment t4, the electronic transmission control 13 detects a downshift request. But, according to the prior art, the automatic transmission will first terminate the upshift, i.e. at moment t5 being for the second clutch K2 at the point L, a first and second pressure ramps up to moments t7 and t8, respectively, corresponding to the points M and N. During the first pressure ramp, the second clutch K2 begins to take over the load from the first clutch K1. This is detected by the transmission input rotational speed nT changing in direction of the point C, the synchronization point of the first gear ratio i1. At moment t6, the transmission input rotational speed nT has again reached the synchronous rotational speed of the first gear ratio i1 so that the first clutch K1 becomes completely disengaged. The further curve of the transmission input rotational speed nT is determined by the pressure ramp corresponding to M and N, time interval t7 to t8. The time interval t5 to t8 corresponds to the second phase of the overlapping gear shift. In time interval t8 to t9, the second clutch K2 is passed to a pressure level outside the gear shift, this corresponds to the pressure level of the point O. The upshift is terminated at t9. The third phase thus corresponds to the time interval t8 to t9.

Second example:

The solution, according to the invention, shows in FIG. 3B the curve cycle with the points A, A1, B1, C and D1. In FIG. 3C, the curve cycle with the points E, F, G, G1 and H1. In FIG. 3D, the curve cycle with the points K and L. The gear shift cycle, up to moment t4, develops as described above. At moment t4, it is assumed that a downshift request presettable by a driver is present. Since this occurs within the first phase, the electronic transmission control will then, at moment t4, confirm the abort criterion and issue the downshift command, thereby changes the signal level SB from zero to one in FIG. 3A. As a consequence of this, the pressure level of the first clutch will rise from the actual pressure level, corresponding to the point G, via a ramp function, to the first pressure level, this corresponds to the value of the point G1. The pressure level of the second clutch K2 is simultaneously reduced to zero from the actual pressure level, i.e. the filling pressure level corresponding to the point L1, via a ramp function. Hereby, the transmission input rotational speed nT in point A1 changes in direction to the point B1. The rotational speed value of the point B1 corresponds here to the synchronous speed of the first gear ratio i1. Thereafter the transmission input rotational speed nT will change up to moment t8 only according to the first gear ratio. The pressure level of the first clutch pK1 will remain constant, corresponding to the pressure level of the point G1.

If a downshift is requested during the second phase, this corresponds to the time interval t5 to t8, then the abort criterion is only confirmed when a time step activated with the beginning of the second phase still has not exceeded a limit value. The time step is designated in FIG. 3B with tF2. The limit value preferably corresponds here to moment t6. A request for a downshift at the t5A moment, as shown in FIG. 3A, would thus result in the abort criterion being confirmed and the electronic transmission control issuing the downshift command. The admissibility of the abort criterion can be determined instead of via a time step also via the transmission input rotational speed nT. During the second phase, the abort criterion is here confirmed only when the actual transmission input rotational speed still has not fallen below the synchronous rotational speed value of the first gear ratio i1. This corresponds in FIG. 3B to the point C, i.e. an abort of the upshift in a transmission input rotational speed below the point C is no longer admitted, since a reaction of the automatic transmission perceivable by the driver has already appeared. Another possibility of determining the admissibility of the abort criterion consists in effecting this depending on the pressure level pK2 of the second clutch. If the pressure level of the second clutch pK2 is lower than a limit value GW, then the abort criterion is confirmed. In the practice, this limit value can be implemented, e.g. so that a hydraulic of the second clutch disengages the first clutch. The limit value GW is accordingly shown in FIG. 3D. Starting from the point B1 or G1, it is possible to carry out additional downshifts, e.g. according to the driver's wish.

The solution, according to the invention, offers the advantage that for the above described case from the practice the rigid cycle of upshift, blocking time and subsequent downshift is interrupted. Unnecessary gear shifts, e.g. an upshift from the fourth to the fifth gear, followed by a downshift from the fifth to the fourth gear, are eliminated. The characteristic of the automatic transmission is more closely tied to the driver's desired performance, i.e. the automatic transmission acts more spontaneously.

Figure 4A:
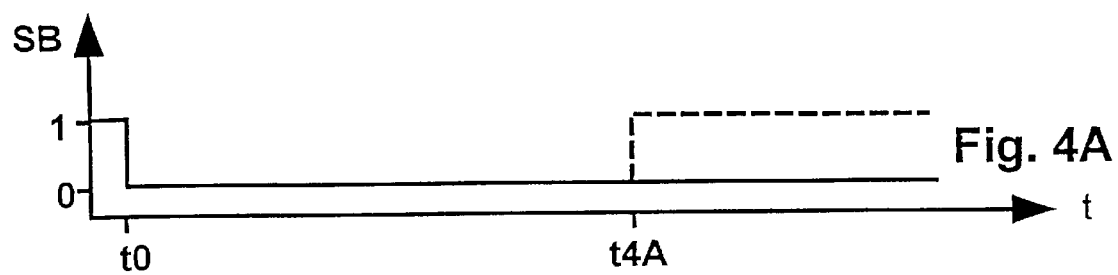
Figure 4B:
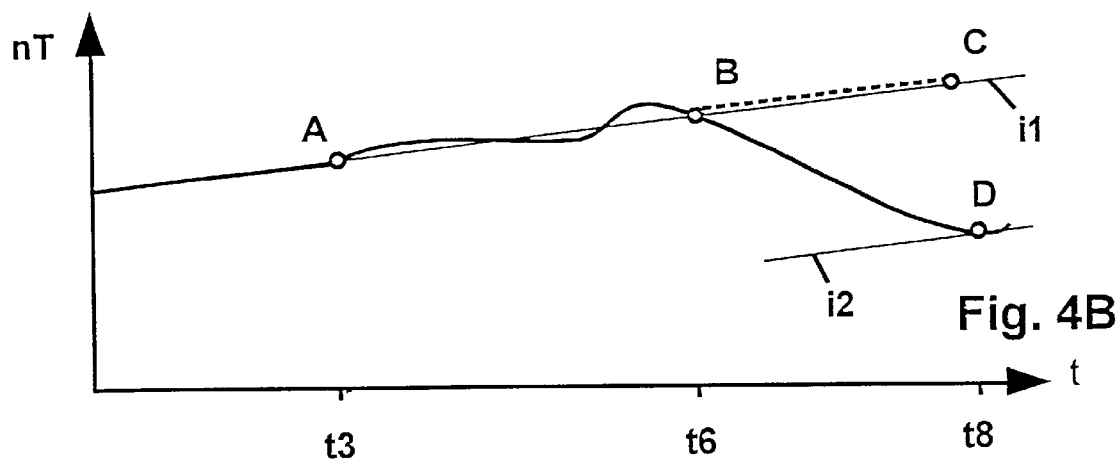
Figure 4C:
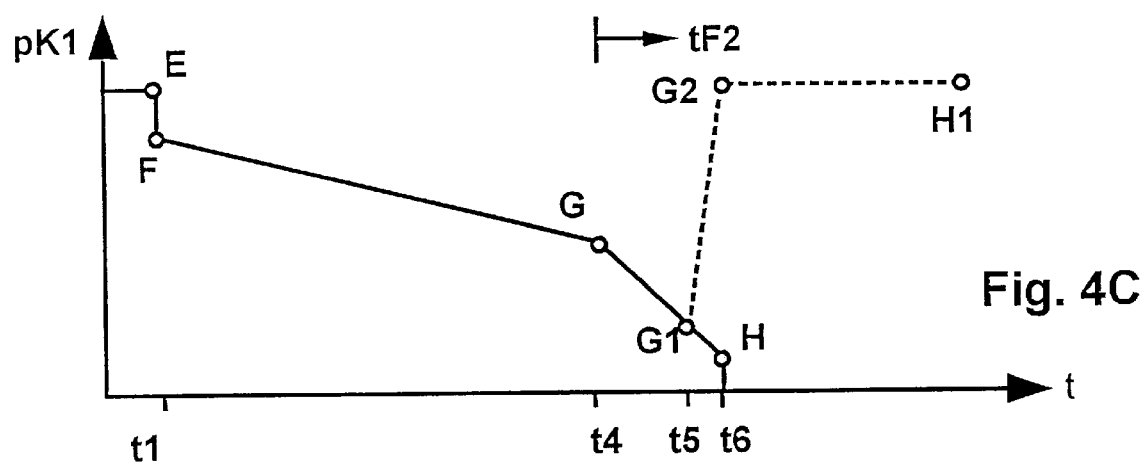
Figure 4D:
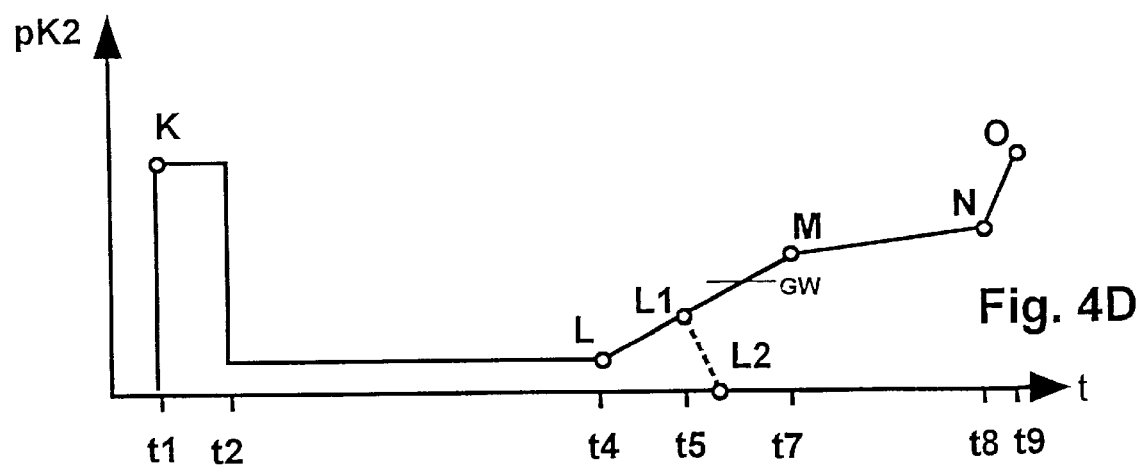

In FIG. 4, a second embodiment is shown consisting of the parts FIGS. 4A to 4D. This second embodiment is based on a control method for load take over in an automatic transmission, as it also has been disclosed in DE-OS 42 40 621. In this control method only, one small rotational speed increase of the transmission input rotational speed nT is set, e.g. less than 10 revolutions. In FIGS. 4B to 4D, two examples are shown. The first example shows a gear shift cycle, according to the prior art, and designed in dotted line.

First example:

The gear shift cycle according to the prior art corresponds in FIG. 4B to the series of curves with the points A, B and D. In FIG. 4C to the series of curves with the points E, F, G and H. In FIG. 4D to the series of curves with the points K, L, M, N and O.

At moment t0, the electronic transmission control 13 issues an upshift command. In FIG. 4A, the signal curve SB thereby changes from one to zero. At moment t1, the pressure level of the first clutch K1 becomes reduced from a first pressure level to a second pressure level. This corresponds in FIG. 4C to the points E and F. Thereafter follows a first pressure ramp up to moment t4. The pressure ramp is selected so that during the curve a small rotational speed increase of the transmission rotational speed nT appears. This occurs at moment t3 in point A. Likewise at moment t1 up to moment t2, the second clutch K2 is loaded with the rapid filling pressure, pressure level corresponding to the point K. Thereafter follows for the second clutch K2, the filling equalization phase up to moment t4. The first phase of the overlapping gear shift corresponds here to the time interval t1 to t4. At moment t4 begins for the second clutch K2 up to moment t8 a first and second pressure ramps, this corresponds to the range point L up to the point M, for the taking over of the load from the first clutch K1 and the points M to N. At moment t4 simultaneously begins for the first clutch K1, a second pressure ramp during which the pressure level of the first clutch K1 becomes reduced. The final point of the pressure ramp is point H. The increases of both pressure ramps, corresponding respectively to the ranges G, H and L and M, are usually designed equal. During the time interval t4 to t7, the second clutch K2 takes over the load from the first clutch K1 so that the transmission input rotational speed curve nT in FIG. 4B changes in direction of the synchronization point of the second gear ratio i2. As soon as the second clutch has taken over the load, which is approximately at moment t6, the first clutch K1 becomes completely opened. The second phase of the overlapping gear shift corresponds to the time interval t4 to t8. At moment t8, the second clutch K2 is led to a new pressure level corresponding to the point O. At moment t8, the transmission input rotational speed nT has reached the synchronization point D of the second gear ratio i2. The gear shift is terminated at t9. The time interval t8 to t9 corresponds to the third phase of the overlapping gear shift.

Second example:

The second example shows a curve according to the invention. In FIG. 4B, this corresponds to the series of curves A, B and C; in FIG. 4C to the series of curves with the points E, F, G, G1, G2 and H1; in FIG. 4D to the series of curves with the points K, L, L1 and L2. In this embodiment, it is assumed that the downshift command takes place during the second phase. Up to moment t4, the curves of the transmission input rotational speed and the pressure curves of the first and second clutch result as above described. At moment t4A, the electronic transmission control 13 issues the downshift command. In FIG. 4A, the signal level thereby changes from zero to one. At moment t5, this is, already in the range of the actual load take over, the first clutch K1 increases over a ramp from the actual pressure value, corresponding to the point G1 to the original first pressure level corresponding to the point E or G2. At the same time, the second clutch is likewise led over a ramp from the point L1 to the point L2. The transmission input rotational speed curve nT thereby changes according to the first gear ratio i1. At moment t6, i.e. upon reaching the point G2, the gear shift is terminated. This means that thereafter other gear shifts derived from the driver's wish can immediately be carried out.

The downshift is requested during the second phase, i.e. the time interval t4 to t8. The abort criterion is confirmed, since a time step activated with the beginning of the second phase still has not exceeded a limit value. This time step is designated in FIG. 4C with tF2. The limit value preferably corresponds here to moment t6. The admissibility of the abort criterion can be determined also by the transmission input rotational speed nT instead of by the time step tF2. The abort criterion is only confirmed here during the second phase when the actual transmission input rotational speed value nT still has not fallen below the synchronous speed value of the first gear ratio i1. This corresponds in FIG. 4B to the point B, i.e. an abort of the upshift at a transmission input rotational speed nT below the point B is no longer allowed, since here a reaction of the automatic transmission perceivable by the driver has already set in. One other possibility of determining the admissibility of the abort criterion consists in effecting this according to the pressure level pK2 of the second clutch. If the pressure level of the second clutch pK2 is lower than a limit value GW, the abort criterion is confirmed. In the practice, this limit value can be implemented, e.g. so that a hydraulic ** of the second clutch opens the first clutch. The limit value GW is shown in FIG. 4D accordingly.

The embodiment, according to FIG. 3, and the embodiment, according to FIG. 4, have in common that in a change from coast to traction or viceversa during the upshift, the abort criterion is not confirmed until a blocking time has lapsed.

REFERENCE NUMERALS 1 prime mover
2 input shaft
3 hydrodynamic converter
4 impeller
5 turbine wheel
6 stator
7 converter clutch
8 turbine shaft
9 Ravigneaux set
10 free wheel FL1
11 planetary gear set
12 transmission output shaft
13 electronic transmission control
14 micro-controller
15 memory
16 function block control actuators
17 function block calculation
18 transmission input rotation speed signal
19 transmission output rotational speed signal
20 input variables
21 hydraulic control unit

What is claimed is:

1. A method for carrying out an overlapping gear shift in an automatic transmission comprising the steps of:
   opening a first clutch (K1);
   closing a second clutch (K2);
   determining in a first phase of the overlapping gear shift a pressure curve of the first clutch (K1) by a transmission input rotational speed (nT);
   taking over a load of the first clutch (K1) by the second clutch (K2) in a second phase of the overlapping gear shift;
   closing completely the second clutch (K2) in a third phase of the overlapping gear shift;
   triggering an upshift from a first gear ratio (i1) to a second gear ratio (i2) without a time delay;
   detecting an abort criterion, said criterion corresponding to a down shift request presettable by a driver;
   interrupting the upshift without delay; and
   returning to the first gear ratio (i1) when the abort criterion is present prior to a beginning of the third phase of the overlapping gear shift;
   wherein a spontaneity of the automatic transmission is increased.

2. The method according to claim 1 comprising the step of:
   confirming the abort criterion during the second phase only when a time step (tF2) having been activated by a beginning of the second phase has not exceeded (tF2<Gw) a limit value (GW).

3. The method according to claim 1 comprising the step of:
   confirming the abort criterion during the second phase only when an actual transmission input rotational speed value (nT(t)) has not fallen below (nT<nT(i1)) a synchronous speed (nT(i1)) of the first gear ratio (i1).

4. The method according to claim 1 comprising the step of:
   confirming the abort criterion during the second phase only when a pressure level of the second clutch (pK2) has not exceeded (pK2<Gw) a limit value (GW).

5. The method according to claim 1 comprising the step of simultaneously:
   increasing a pressure level of the first clutch (pK1) from an actual pressure level using a ramp function; and
   reducing a pressure level of the second clutch (pK2) using a ramp function from an actual pressure level to a zero pressure level.

6. The method according to claim 5 comprising the step of:
   confirming the abort criterion when a change is made from one of coast to traction and traction to coast, only after lapse of a time step.

* * * * *